(12) United States Patent
Braun et al.

(10) Patent No.: US 9,469,275 B2
(45) Date of Patent: Oct. 18, 2016

(54) DEVICE AND METHOD FOR ACTUATING A DRIVE UNIT OF A WIPER SYSTEM

(75) Inventors: Peter Braun, Buehlertal (DE); Norbert Wegner, Buehl (DE); Harald Retsch, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 2094 days.

(21) Appl. No.: 12/305,505

(22) PCT Filed: Oct. 31, 2007

(86) PCT No.: PCT/EP2007/061715
§ 371 (c)(1),
(2), (4) Date: Dec. 18, 2008

(87) PCT Pub. No.: WO2008/080666
PCT Pub. Date: Jul. 10, 2008

(65) Prior Publication Data
US 2009/0282636 A1 Nov. 19, 2009

(30) Foreign Application Priority Data

Dec. 28, 2006 (DE) .......................... 10 2006 061 679

(51) Int. Cl.
*H02P 1/04* (2006.01)
*B60S 1/08* (2006.01)

(52) U.S. Cl.
CPC ....................... *B60S 1/08* (2013.01)

(58) Field of Classification Search
USPC ........ 318/443, 444, 483, DIG. 2; 15/250.12, 15/250.13, 250.14, 250.15, 250.16, 15/250.17; 307/9.1, 10.1
See application file for complete search history.

(56) References Cited

U.S. PATENT DOCUMENTS

| | | | | |
|---|---|---|---|---|
| 4,544,870 | A | * 10/1985 | Kearns et al. | 318/444 |
| 5,119,002 | A | * 6/1992 | Kato et al. | 318/444 |
| 5,508,595 | A | * 4/1996 | Schaefer | 318/444 |
| 5,630,009 | A | 5/1997 | Hayden | |
| 5,818,187 | A | 10/1998 | Savage et al. | |
| 6,144,906 | A | * 11/2000 | Buchanan et al. | 701/36 |
| 6,400,111 | B1 | * 6/2002 | Detar | 318/445 |
| 2007/0240274 | A1 | * 10/2007 | Buchanan, Jr. | 15/250.352 |
| 2007/0261191 | A1 | * 11/2007 | Yagi | 15/250.001 |

FOREIGN PATENT DOCUMENTS

| | | |
|---|---|---|
| DE | 4033332 | 4/1991 |
| DE | 4330112 | 3/1995 |
| DE | 4330112 A1 | 3/1995 |
| JP | 4891628 | 11/1973 |
| JP | 58112586 | 7/1983 |

(Continued)

OTHER PUBLICATIONS

PCT/EP2007/061715 International Search Report.

*Primary Examiner* — Shawki S Ismail
*Assistant Examiner* — Jorge L Carrasquillo
(74) *Attorney, Agent, or Firm* — Michael Best & Friedrich LLP

(57) ABSTRACT

The invention relates to a device and a method for actuating a wiper system. The device comprises a drive unit (2) for driving at least one wiper arm (4), and a control unit (6), wherein the control unit (6) is designed to set a wiping frequency of the wiper arm (4) as a function of a load variable which is dependent on the torque which is to be applied by the drive unit (2) during a wiping operation.

16 Claims, 2 Drawing Sheets

(56) References Cited

FOREIGN PATENT DOCUMENTS

| JP | 60056655 | 4/1985 |
|----|----------|--------|
| JP | 04303057 | 10/1992 |
| JP | 4303057 | 10/1992 |
| JP | 3582145 | 10/2004 |
| JP | 2005295605 | 10/2005 |
| KR | 1019990035110 | 5/1999 |
| KR | 1020000064263 | 11/2000 |
| WO | 9637391 | 11/1996 |

* cited by examiner

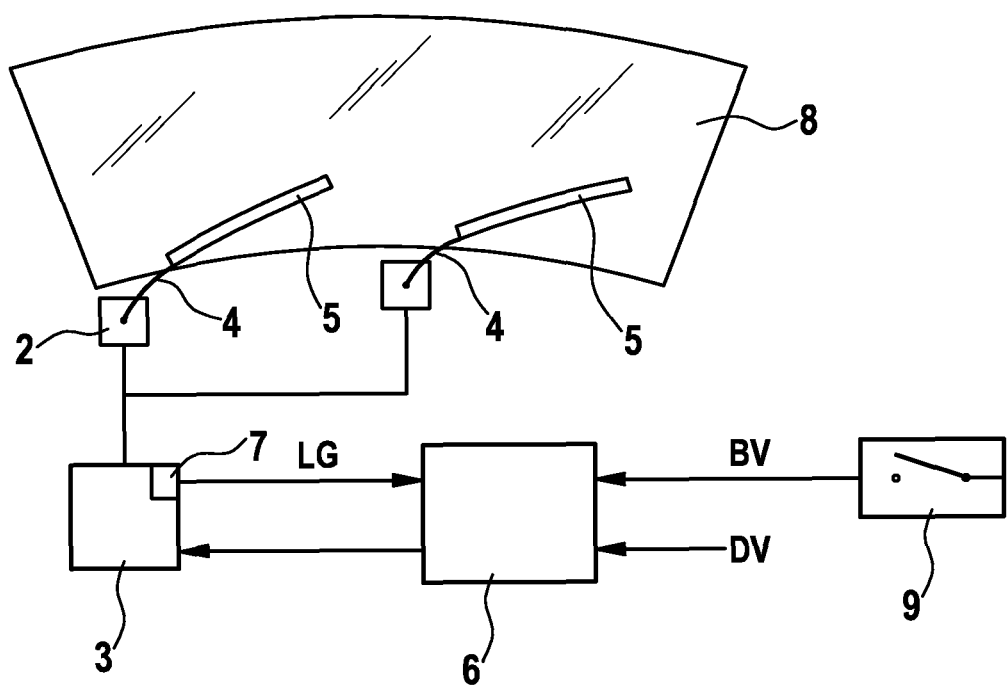

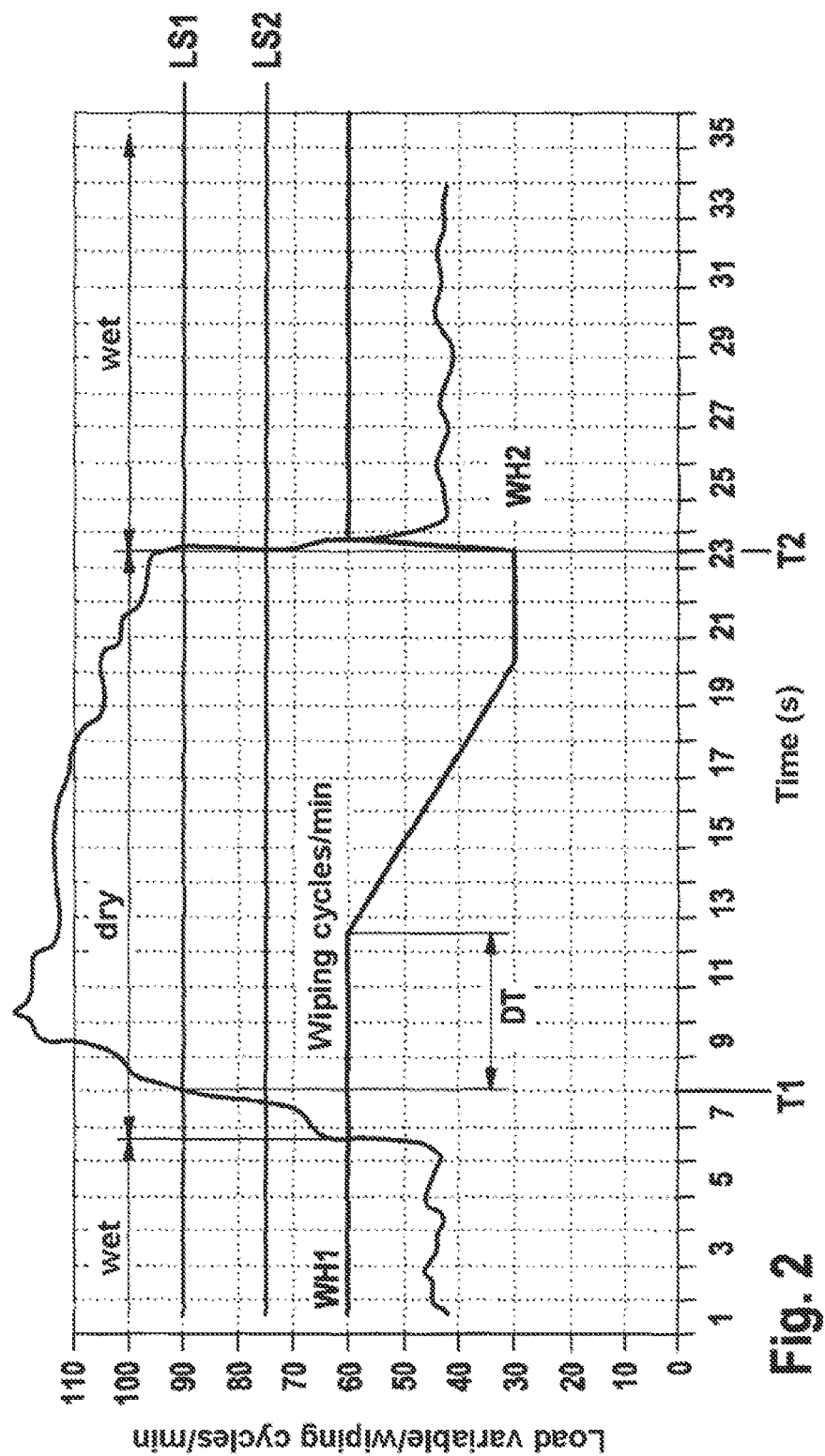

DEVICE AND METHOD FOR ACTUATING A DRIVE UNIT OF A WIPER SYSTEM

BACKGROUND AND SUMMARY OF THE INVENTION

The invention relates to a device for actuating a drive unit for a wiper system, in particular for a windshield wiper system of a motor vehicle. The invention also relates to a method for actuating such a drive unit.

Wiper systems for, for example, windshields of a motor vehicle, have one or more wiper arms which are provided with wiper blades in order to remove moisture in the form of precipitation or the like or water droplets from the windshield. Depending on whether and what kind of precipitation is present on the windshield, different torque values are necessary to move the wiper arms owing to the friction between the wiper blades and the surface of the windshield. The torques have to be made available during operation of the wiper arms by a corresponding drive unit for the wiper system. In particular when the wiper arms are operated on a dry window, the friction between the wiper blade and the surface of the windshield is significantly higher than in the case of a wetted surface, with the result that a high torque is necessary to move the wiper arm with a speed which is predefined by the driver.

The relatively high torque which has to be made available by the drive unit gives rise to correspondingly increased power consumption at said unit, as a result of which said unit is heated. In order to avoid damage to the drive unit due to overheating owing to a high power drain, such a drive unit is frequently protected by a thermoswitch. The thermoswitch switches the drive unit off when a predefined threshold temperature is reached or exceeded, in order to protect the drive unit of the wiper system against overheating and resulting damage. The wiping function is not available until after the drive unit has cooled down again below the threshold temperature.

Instead of the thermoswitch it is possible, in wiper motors such as, for example, reversing motors, to acquire the current temperature of the motor or the load on it by using a computational model and to switch off the corresponding drive unit if the temperature or load which is acquired in this way exceeds a corresponding threshold. However, this can lead to a situation in which a wiping function is no longer available to the driver for a certain period of time until the drive unit has correspondingly cooled down. Under certain circumstances, in the event of rain during this time sufficient visibility through the windshield cannot be ensured, as a result of which such switching off during travel can result in danger to the driver.

An object of the present invention is to make available a device for actuating a drive unit for a wiper system which provides reliable protection of the drive unit against overheating and better availability of the wiper system. An object of the present invention is also to make available a method for actuating a drive unit of a wiper system.

According to one aspect, a device for actuating a wiper system is provided. The device comprises a drive unit for driving at least one wiper arm and a control unit. The control unit is designed to set a wiping frequency of the wiper arm as a function a load variable which is dependent on a torque which is to be applied by the drive unit during a wiping operation.

The device according to the invention makes it possible to use a load variable to detect when conditions apply for an increase in temperature in the drive unit of the wiper system. As a function of the load variable, which can be acquired, for example, on the basis of actuating parameters of the drive unit, the wiping frequency or the wiping speed is correspondingly adapted in order to prevent overheating of the drive unit or an interruption in the operation of the drive unit owing to an emergency shut-down which is carried out as a function of an excessive temperature. Since an increase in the load in the drive unit is frequently caused by high friction between a dry surface of the window and the wiper blade of the wiper system, the reduction in the wiping frequency, instead of switching off the wiping, does not result in any adverse effect for the driver's vision. Adapting the wiping frequency on the basis of the load variable has the advantage that an excessive increase in temperature in the drive unit can already be avoided in advance.

Furthermore, a driver unit for actuating the drive unit and for setting a wiping frequency in accordance with a manipulated variable can be provided.

According to a further embodiment, a load variable detector is provided in order to make available the load variable as a function of the torque which is to be applied by the drive unit. In particular, the load variable detector is provided in order to determine the load variable as a function of at least one of the variables comprising the drive voltage, drive current and rotational speed which are present in the drive unit.

The control unit preferably reduces the wiping frequency of the wiper arm from a first wiping frequency to a second reduced wiping frequency if the load variable exceeds a load threshold.

Furthermore, the control unit can reduce the wiping frequency of the wiper arm after the load variable has exceeded the load threshold, after a predefined time period or after a predefined number of wiping cycles.

It is possible to provide that the control unit reduces the wiping frequency of the wiper arm to the second wiping frequency in accordance with a continuous decrease in the wiping frequency.

Furthermore, the control unit can set the first wiping frequency of the wiper arm after a second load threshold has been undershot, immediately or in accordance with a predefined continuous rise.

A switch which can be operated manually is preferably provided for setting the wiping frequency to a predefined wiping frequency independently of the wiping frequency which is set.

According to a further aspect, a method is provided for actuating a wiper system. In this connection, during the operation of a wiper arm a wiping frequency is set as a function of a torque which is to be applied for wiping with the wiper arm.

BRIEF DESCRIPTION OF THE DRAWINGS

Preferred embodiments of the invention will be explained in more detail below with reference to the appended drawings, in which:

FIG. 1 shows a block diagram of a wiper system according to an embodiment of the invention; and FIG. 2 shows a timing diagram illustrating the method of functioning of the actuation device through an illustration of the load moment and wiping frequency which is set.

DETAILED DESCRIPTION

FIG. 1 shows a wiper assembly 1 according to an embodiment of the present invention. The wiper assembly 1 comprises a wiper system with a drive unit 2 which is actuated by a driver unit 3. The drive unit 2 can comprise a rotary motor or a reversing wiper motor which is coupled to a wiper arm 4 directly or, for example, via a suitable gear mechanism (not shown). A wiper blade 5 is attached to the wiper arm 4. During operation, the drive unit 2 actuates the wiper arm in such a way that the wiper blade 5 moves over the surface of a windshield 8 of a vehicle in order to remove precipitation, rain droplets, dirt and the like on the surface.

The driver unit 3 actuates the drive unit 2 using, for example, pulse-width-modulated signals in order to operate the wiper system in a desired operating state. For this purpose, a manipulated variable is made available to the driver unit 3 via a control unit 6. The manipulated variable determines, for example, one or more voltages or voltage pulses which are made available to the drive unit 2 by the driver unit 3 in order to provide a specific drive torque and/or a specific rotational speed. Alternatively, the manipulated variable can also merely specify a wiping frequency from which the driver unit 3 acquires the corresponding actuation variables for the drive unit 2 in order to drive them in such a way that the wiper arm 4 is operated with the predefined wiping frequency.

The control unit 6 acquires the manipulated variable in accordance with the selected operating state on the basis of a user specification BV which is received in the control unit 6 or some other detector specifications DV, for example from a rain sensor. The user specifications BV can correspond to a position of a steering column switch, as a result of which a wiping frequency and switching on and off the wiper system are determined.

The manipulated variable determines the function of the wiper system, i.e. determines the wiping frequency. The wiping frequency generally specifies the number of wiping cycles per time unit. This can be determined, on the one hand by the speed of the wiper arm during a wiping cycle, i.e. the period of time which one wiping cycle takes, and on the other hand by a wiping interval. The wiping interval specifies an interruption time between two wiping movements (wiping cycles) during which the wiper arm remains in a predetermined position, preferably a lower reversal position. Such a wiping interval may be provided, for example, if, for the purpose of reducing the load in the drive unit 2, the speed of the wiper arm 4 cannot be reduced further without the wiper blade 5 juddering on the surface of the windshield.

The driver unit 3 has, for the purpose of detecting a load torque at the drive unit 2, a load detector 7 which signals back a load variable LG to the control unit 6. The load variable corresponds to a value of the instantaneously active load torque at the wiper arm 4 of the wiper system. The load variable can be acquired by means of physical data which are present in the drive unit 2. Such physical data can include the terminal voltage of the motor of the drive unit 2, the drive current and the instantaneous rotational speed of the motor of the drive unit 2. In general, the load variable describes how "heavily" or "lightly" the wiper arm 4 moves over the surface of the windshield 8.

If it is detected in the control unit 6 that an increased load is present on the basis of this load variable LG, the manipulated variable is adapted in order to reduce the wiping frequency of a first wiping frequency WH1 to a predefined second relatively low wiping frequency WH2. This can be seen in FIG. 2 from the illustrated timing diagram which illustrates the profile of the wiping frequency (wiping cycles/min) as a function of the load variable. The fact that an increased load is present can be detected at a time T1 through, for example, comparing the current load variable with a predefined first load variable LS1. An increased load is present if the current load variable LG exceeds the first load threshold LS1, which can occur, for example, when the windshield 8 dries. The fact that the wiping frequency should be adapted can be indicated, for example, through a switchover signal which is made available to the control unit 6. In order to rule out the possibility that brief increases in the load variable do not lead directly to a reduction in the wiping frequency, the switchover signal cannot be generated until the load variable exceeds the first load threshold for a specific time period. An integration element can also be provided for the difference between the load variable and the first load threshold, said integration element not generating the switchover signal until an integration value is reached.

As a function of the switchover signal and using the manipulated variable which is transmitted to the driver unit 3, the control unit 6 reduces the wiping frequency from the first wiping frequency WH1 to a second wiping frequency WH2 which is predefined or dependent on the acquired load variable.

The wiping frequency can be reduced immediately as a sudden change or continuously with a predefined decrease in the wiping frequency as far as the second wiping frequency in order to avoid disruption or distraction of the driver through a change in state which occurs suddenly in the wiper system.

It is also possible to provide that, after the first load threshold LS1 has been exceeded, operation is at first continued with a number of wiping cycles which can be set in the control unit 6 and which have the original wiping frequency, i.e. with a wiping frequency at which wiping was carried out before the occurrence of the increased load, or for a specific time period DT, before the wiping frequency is reduced to the second wiping frequency WH2. This has the effect, like the above-indicated integration of the load variable for determining the switchover signal, of ensuring that increases in load which occur briefly do not lead immediately to a reduction in the wiping frequency.

Given a continuous reduction in the wiping frequency to the second wiping frequency WH2, the decrease in the reduction can be set by a suitable parameter in the control unit 6. Of course, the profile of the reduction to the second wiping frequency WH2 can also be defined in accordance with a plurality of parameters.

When the first load threshold, or a second load threshold LS2 which is different from the first load threshold WH1, is undershot at a time T2, the wiping can be continued again with the original first wiping frequency WH1. The first wiping frequency WH1 can be assumed immediately or in accordance with a continuous rise in the wiping frequency which can be determined by means of parameters. However, the rise in the wiping frequency is preferably steeper than the decrease in the reduction of the wiping frequency since a reduction in the load torque can be caused by suddenly occurring rain, with the result that it is necessary to adapt the wiping frequency as quickly as possible to the prevailing rain situation in order to ensure sufficient visibility for the driver.

According to one predefined scheme, the wiping frequency can be increased by virtue of the fact that initially wiping intervals are reduced and subsequently the wiping speed is corresponding increased further after the wiping intervals have been reduced to zero. The wiping frequency can correspondingly be reduced by reducing the wiping speed to a minimum value and then providing wiping intervals between the wiping cycles. However, it is also possible to set the provision of wiping intervals and the setting of the wiping speed according to a different scheme or independently of one another. For example, in order to reduce the wiping frequency to the second wiping frequency only the length of the wiping intervals can be increased without changing the wiping speed, or conversely only the wiping speed can be reduced without changing the wiping intervals. This applies analogously to the increase in the wiping frequency to the first wiping frequency.

In order to provide the driver with continuous control of the wiping frequency of the wiper system, there is provision that by changing a switched position of a steering column lever 9 it is possible to switch off the reduction in the wiping frequency owing to an increased load, with the result that the functionality described above can be overridden by the driver at any time. This can be done by permanently switching off the reduction function or switching off the reduction function over a limited time, in which case, in the case of a persistently high load, the wiping frequency is reduced after a specific time in accordance with the functionality described above after the steering column lever 9 has been activated.

Although the function of reducing the wiping frequency when an increased load is present prevents the rapid heating of the drive unit 2, the temperature of the drive unit 2 at the second wiping frequency WH2 can nevertheless rise above a critical temperature, for example if the load on the drive unit remains high. However, this can be detected by monitoring the voltages and currents in the drive unit, and it is still possible for a function of emergency shutdown of the drive unit 2 of the wiper system to be provided.

The first load threshold LS1 and the second load threshold LS2 can be set to the same value or to different values. The second load threshold LS2 is preferably lower than the first load threshold LS1, with the result that a switching hysteresis is formed in order to avoid rapid switching to and fro between the normal operating mode and the reducing operating mode.

The invention claimed is:

1. A device for actuating a wiper system, having a drive unit (2) for driving at least one wiper arm (4), and having a control unit (6), characterized in that the control unit (6) sets a wiping frequency of the wiper arm as a function of a load variable which is dependent on the torque which is to be applied by the drive unit (2) during a wiping operation; wherein the control unit (6) reduces the wiping frequency of the wiper arm (4), from a first wiping frequency (WH1) to a second reduced wiping frequency (WH2) if the load variable exceeds a load threshold for a predefined time period (DT) or a predefined number of wiping cycles, and sets the wiping frequency of the wiper arm (4) to the first wiping frequency (WH1) after a second load threshold has been undershot.

2. The device as claimed in claim 1, characterized in that a driver unit (3) for actuating the drive unit (2) and for setting a wiping frequency in accordance with a manipulated variable is provided.

3. The device as claimed in claim 2, characterized in that a load variable detector (7) is provided in order to make available the load variable as a function of the torque which is to be applied by the drive unit (2).

4. The device as claimed in claim 3, characterized in that the load variable detector (7) is provided in order to determine the load variable as a function of at least one of the variables comprising the drive voltage, drive current and rotational speed which are present in the drive unit (2).

5. The device as claimed in claim 1, characterized in that the control unit (6) reduces the wiping frequency of the wiper arm (4) to the second wiping frequency (WH2) in accordance with a continuous decrease in the wiping frequency.

6. The device as claimed in claim 1, characterized in that the control unit (6) sets the first wiping frequency (WH1) of the wiper arm (4) after a second load threshold (LS2) has been undershot, immediately or in accordance with a predefined continuous rise.

7. The device as claimed in claim 1, characterized in that a switch (9) which can be operated manually is provided for setting the wiping frequency to a predefined wiping frequency independently of the wiping frequency which is set.

8. A method of actuating a wiper system, having a drive unit (2) for driving at least one wiper arm (4), the method comprising setting a wiping frequency of the wiper arm as a function of a load variable which is dependent on the torque which is to be applied by the drive unit (2) during a wiping operation; reducing the wiping frequency of the wiper arm (4), from a first wiping frequency (WH1) to a second reduced wiping frequency (WH2) if the load variable exceeds a load threshold for a predefined time period (DT) or for a predefined number of wiping cycles, and setting the wiping frequency of the wiper arm (4) to the first wiping frequency (WH1) after a second load threshold has been undershot.

9. The method as claimed in claim 8, further comprising using a driver unit (3) for actuating the drive unit (2) and for setting a wiping frequency in accordance with a manipulated variable.

10. The method as claimed in claim 9, further comprising using a load variable detector (7) to determine the load variable as a function of the torque which is to be applied by the drive unit (2).

11. The method as claimed in claim 10, further comprising using the load variable detector (7) to determine the load variable as a function of at least one of the variables comprising the drive voltage, drive current and rotational speed which are present in the drive unit (2).

12. The method as claimed in claim 8, further comprising reducing the wiping frequency of the wiper arm (4) to the second wiping frequency (WH2) in accordance with a continuous decrease in the wiping frequency.

13. The method as claimed in claim 8, further comprising setting the first wiping frequency (WH1) of the wiper arm (4) after a second load threshold (LS2) has been undershot, immediately or in accordance with a predefined continuous rise.

14. The method as claimed in claim 8, further comprising using a switch (9) which can be operated manually for setting the wiping frequency to a predefined wiping frequency independently of the wiping frequency which is set.

15. A device for actuating a wiper system, having a drive unit (2) for driving at least one wiper arm (4), and having a control unit (6), characterized in that the control unit (6) sets a wiping frequency of the wiper arm as a function of a load variable which is dependent on the torque which is to be applied by the drive unit (2) during a wiping operation; wherein the control unit (6) reduces the wiping frequency of the wiper arm (4), from a first wiping frequency (WH1) to a second reduced wiping frequency (WH2) if the load variable exceeds a load threshold, and sets the wiper arm (4) to the first wiping frequency (WH1) after a second load threshold (LS2) has been undershot, immediately or in accordance with a predefined continuous rise.

16. A method of actuating a wiper system, having a drive unit (2) for driving at least one wiper arm (4), the method comprising setting a wiping frequency of the wiper arm as a function of a load variable which is dependent on the torque which is to be applied by the drive unit (2) during a wiping operation; reducing the wiping frequency of the wiper arm (4), from a first wiping frequency (WH 1) to a second reduced wiping frequency (WH2) if the load variable exceeds a load threshold; and setting the first wiping frequency (WH1) of the wiper arm (4) after a second load threshold (LS2) has been undershot, immediately or in accordance with a predefined continuous rise.

* * * * *